United States Patent [19]

Hübner

[11] 3,952,141

[45] Apr. 20, 1976

[54] SOCKET-TO-CABLE CONNECTION FOR LIQUID COOLED HEAVY CURRENT CABLE

[75] Inventor: Ernst Hübner, Osnabruck, Germany

[73] Assignee: Kabel-und Metallwerke Gutehoffnungshutte Aktiengesellschaft, Hannover, Germany

[22] Filed: Oct. 17, 1974

[21] Appl. No.: 515,516

[30] Foreign Application Priority Data

Oct. 20, 1973 Germany............................ 2352785

[52] U.S. Cl............................... 174/19; 174/15 WF

[51] Int. Cl.$^2$...................... H01B 7/34; H02G 15/22

[58] Field of Search ............... 174/19, 15 C, 15 BH; 339/112, 117; 219/130

[56] References Cited

UNITED STATES PATENTS

| | | | |
|---|---|---|---|
| 2,835,721 | 5/1958 | Leathers | 174/19 X |
| 3,808,350 | 4/1974 | Kluge et al. | 174/19 |

*Primary Examiner*—Arthur T. Grimley
*Attorney, Agent, or Firm*—Ralf H. Siegemund

[57] ABSTRACT

A heavy current cable has an inner tube, an outer envelope and conductors inbetween. A socket (one on each end) has a body, a sleeve for insertion of the conductor ends and for fastening of the outer envelope, and a tube threaded into the socket body and being liquid-conductively connected to the inner cable tube. The conductors are strapped to that socket tube for fastening thereto. The space between socket tube and sleeve is filled with soft solder for additionally anchoring the conductor ends thereof.

7 Claims, 3 Drawing Figures

1
2
3
4
5
5a
5b
6
7
7a
8
9
10
11
12
13
14
15
16
2

SOCKET-TO-CABLE CONNECTION FOR LIQUID COOLED HEAVY CURRENT CABLE

BACKGROUND OF THE INVENTION

The present invention relates to liquid cooled high power cable, particularly of the heavy current type used to apply power to electrical arc melting furnaces.

Heavy current cable with liquid cooling are comprised for example, of an inner tube through which passes the coolant, and conductors, possibly of the stranded variety, are disposed on that tube. This particular assembly is jacketed in a tubular envelope or hose. The ends of such a cable are connected to a socket which serves also as connector for the liquid coolant.

Steel scrap, sponge iron and prereduced iron ore is often melted in such arc furnaces fed with electric current from suitable power supply sources, e.g., transformers via water cooled cables. Cooling protects the cable against the rather heavy electric current. Aside from being capable of conducting high current, such cable must also withstand high outside temperature and will undergo significant mechanical wear and loads.

For example, the conductors of the cable must be fastened securely to the connector sockets even if high mechanical tension is applied, possibly even under conditions of unexpected heating if, for example, the coolant supply drops out accidentally or otherwise.

German printed patent application No. 2,140,768 discloses a way of fastening the conductors in that some of them are fastened to the periphery of the central tubing, using tubular clamps. Of course, only some of the conductors are secured to the sockets in that manner. Moreover, it was found that this particular fastener is insufficient. Expenditure is also quite high if the cable has, for example, ten conductors.

DESCRIPTION OF THE INVENTION

It is an object of the present invention to avoid the drawbacks outlined above and to improve safety and reliability of operation, construction and installation of a liquid cooled, heavy current cable.

It is another object of the present invention to improve the fastening of conductors to sockets in a liquid cooled, heavy current cable with a central conduit for a coolant.

In accordance with the preferred embodiment of the invention, the socket into which cable conductor ends are inserted, has an internal tube to which all conductor ends are clamped, preferably by multiple clamping straps. Solder may be used in addition for anchoring the conductors in the socket, but fastening of them thereto does not depend on the solder.

The particular tube used for fastening the conductor ends indirectly to the socket is preferably corrugated on the outside, under conditions which do not impede its strength and stiffness, particularly with regard to radial squeezing. The corrugation is circular or helical to enhance friction between the tube and the conductors clamped thereto, such friction to be effective particularly with regard to axial pull on the conductors.

The tube to which the conductors are fastened by clamping straps is threaded into the socket body. The straps are made antimagnetic to avoid any influence on them by the heavy electric current.

The cable as connected to the socket has an inner and an outer tube or hose and the conductors are disposed in the annular space of these tubes. If the coolant is fed to this annular space of the cable, by means of feeder tubes as disclosed and claimed in my copending application (D-5598), the clamping straps should pass underneath these feeder tubes, so that they will not squeeze them as coolant flow therethrough must not be impeded.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
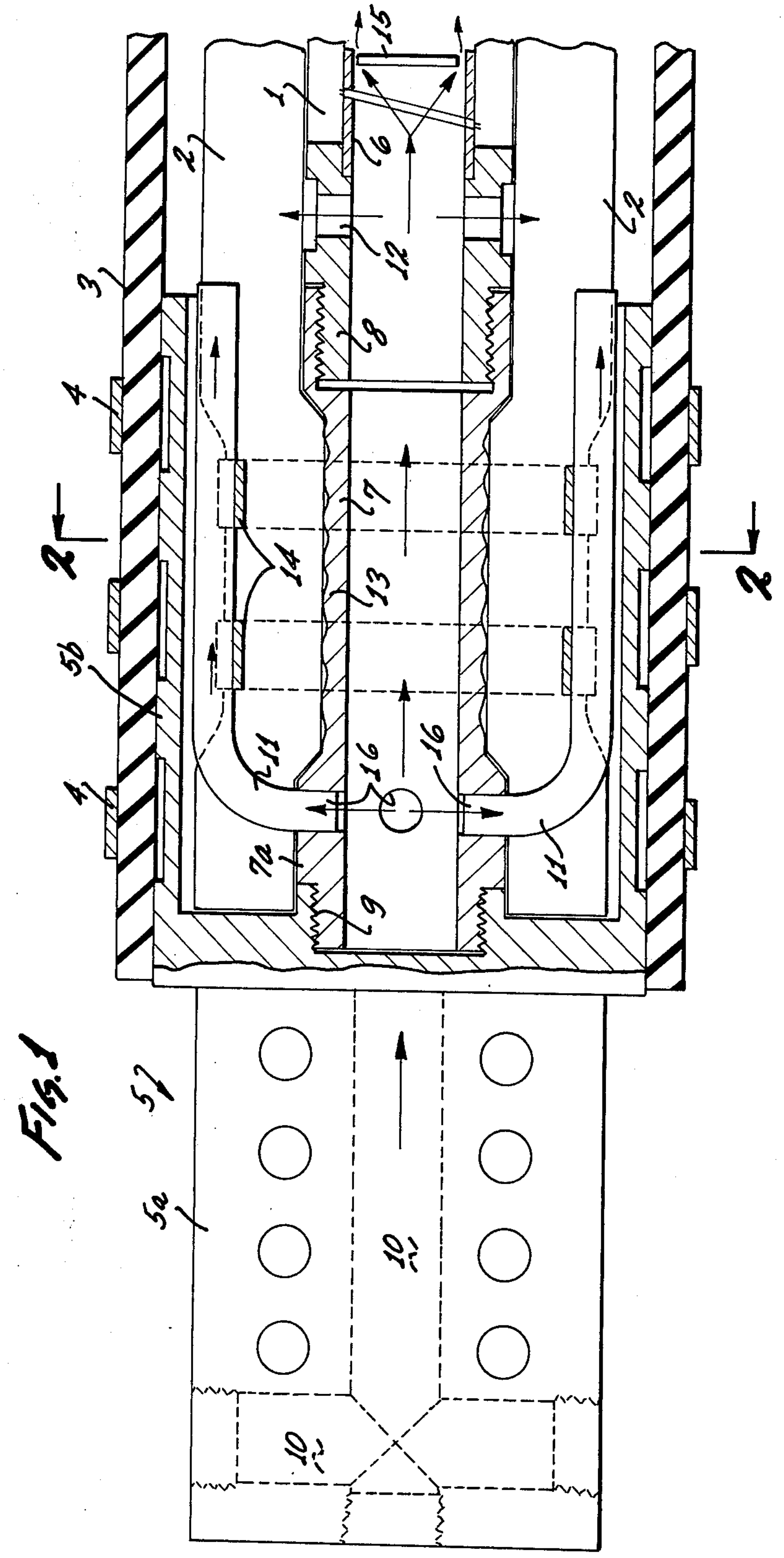
FIG. 1 illustrates a longitudinal section through a socket and end of a liquid cooled cable constructed in accordance with the preferred embodiment of the invention.

Proceeding now to the detailed description of the drawings, the cable illustrated here is comprised of an inner tube 1, for example, a hose made of synthetic rubber, traded under the name Neoprene. A plurality of stranded conductors 2 are disposed along and around the periphery of that tube 1. The tube and conductor assembly is enveloped by a rubber hose 3, preferably of the type which is reinforced by plies of fabric. Hose or tube 3 is essentially concentric to tube or hose 1, and the conductors occupy a portion of the ring or annular space between tubes 1 and 3.

Reference number 5 refers to a cable socket to which the various parts are connected. The socket has a main body 5*a* and a sleeve like extension 5*b*. Rubber hose or envelope 3 is connected to socket extension 5*b* by means of clamps 4 which are antimagnetic. The conductor ends are inserted into that extension 5*b*.

The hose 1 is held by a flexible sleeve 6 which in turn is held by a threaded connector 8, to which it is soldered. Connector 8 in turn is threaded in a tube 7 which extends from socket 5, in that the tube 7 is threaded into the socket body 5*a* at 9, well inside of sleeve extension 5*b*.

The socket 5, particularly main body 5*a* is a solid piece of forged metal with a central bore 10 and lateral ducts for running water to the cable. Bore 10 communicates with tube 7 and the important feature here is that the conductors 2 themselves will be enveloped by flowing water in the following manner.

Figure 3:
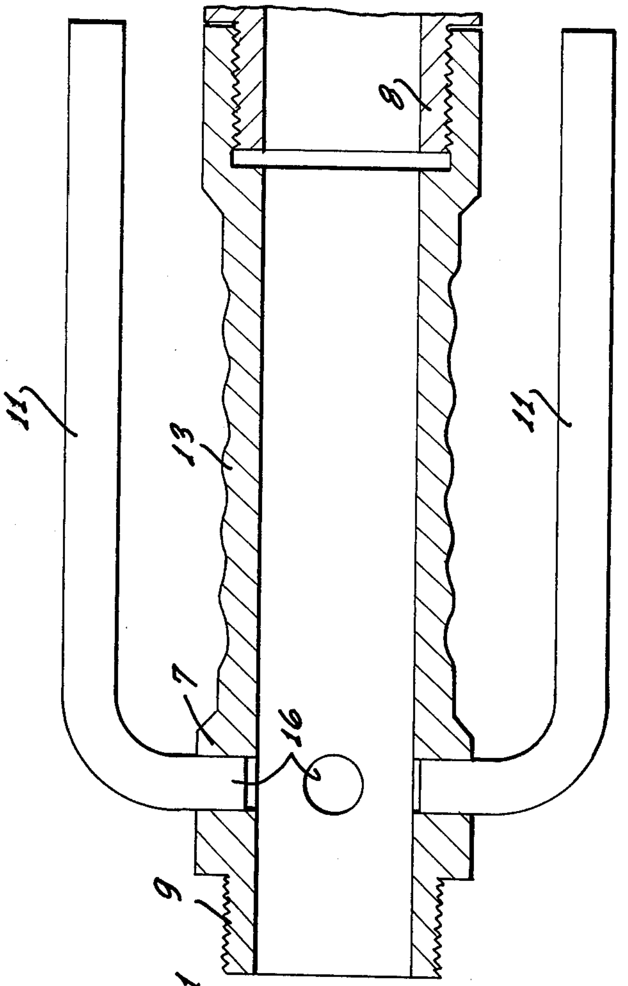
FIG. 3 is a section view of a sub-assembly of the assembly shown in FIG. 1.

As shown more specifically in FIG. 3, tube 7 has four radial (lateral) openings 16, and bent tubes 11 are soldered to tube 7 to run the water from the conduit path 10-7 so the annular space between tubes 1 and 3 containing the conductors. Particularly, these feeder tubes 11 extend radially from tube 7 in a star pattern and veer into axial direction along the general extension of the cable to discharge cooling fluid freely into the space between respective two conductors.

Figure 2:
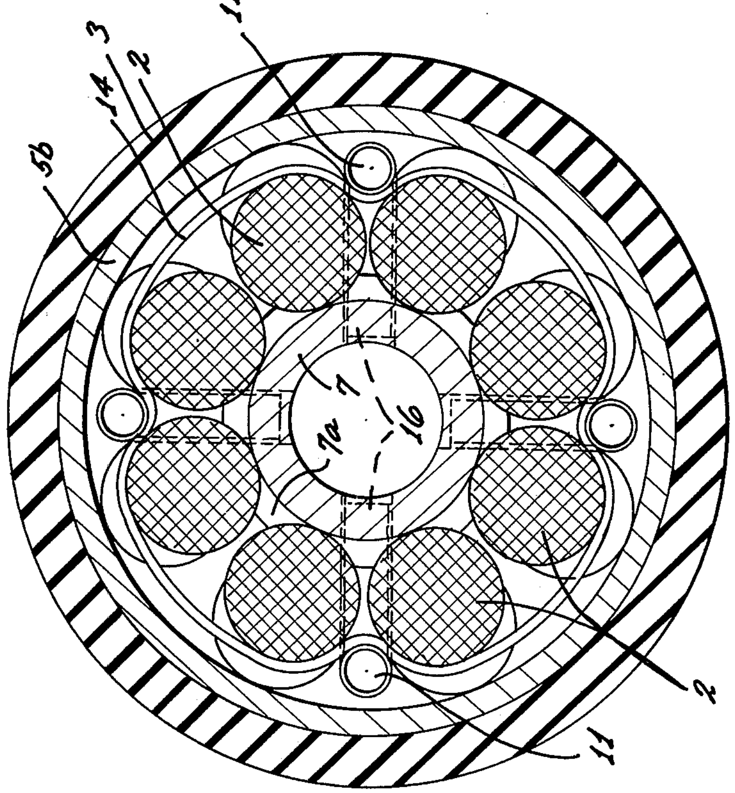
FIG. 2 is a section view along line 2—2 in FIG. 1.

As can be seen best from FIG. 2, the axial ends of tubes 11 end inbetween respective two adjacent conductors 2. The Figure shows eight conductors 2 and four such tubes 11. Eight tubes 11 of like or smaller dimensions could be used instead. Size and number of tubes 11 employed depends to a considerable extent on the rate of coolant flow needed for a particular electrical power consumption by the cable.

Tubes 11 are made of metal, preferably copper or another heat proof material. The tubes 11 are brazed to tube 7 or otherwise connected thereto at the openings 16.

As can be seen from FIGS. 1 and 2, bores 12 are additionally provided in connector 8 for passing, additionally, water into the annular space between the inner and outer tubes 1 and 3 for cooling the conductors 2 by way of direct contact with these conductors. Thus, part of the coolant fed to duct 10 in socket 5 passes through these bores 12 and another part of the coolant is fed to the conductors through tubes 11. A cover or or stop 15 in tube 6 permits only a small portion of water to pass into tube 1. The cooling effect provided by the water in hose 1 is rather small and the water is used here primarily as stabilizer.

The construction of tube 7 is more readily derivable from FIG. 3. The tube has a corrugated exterior 13 to increase friction between it and the conductor 2, which are to be secured to that tube 7. The corrugations particularly prevent slippage of the conductors. Moreover, tube 7 has slightly widened axial ends for reasons which will be shown shortly.

Conceivably, tube 7 could be corrugated as a whole. However, it is preferred to use a basically straight wall tube in which corrugations have been machined through turning, milling or the like. This way, no flexibility is imparted upon the tube 7 which remains particularly stiff as against squeezing when the conductors are strapped thereto, as will be described shortly.

It should be noted, that the conductors 2 have a more radial outward disposition adjacent the thicker end portions 7*a* of tube 7 and they come close to the inner wall of socket sleeve 5*a*. Accordingly, the conductors are also radially spaced in these regions and here particularly, where the radial portions of feeder tubes 11 pass from tube 7 between respective two conductors, spread radially thereat accordingly. The circles 2*a* represent this displaced disposition.

Clamping straps 14 are particularly provided for fastening the conductors to tube 7. These straps are preferably antimagnetic, and they clamp the conductors onto and against tube 7, so that they are maintained in position even under high tension. Particularly, these straps urge the conductors 2 into conformity with the outer contour of tube 7 and here particularly, the corrugated and radially recessed portion 13 thereof. The reason for using antimagnetic straps and clamps is to be seen in that interference should be avoided with the clamping action by strong electromagnetic fields emanating from the heavy current through the conductor.

Additionally, soft solder may be used to anchor the conductors 2 to tube 7 inside of socket sleeve and extension 5*b*. Please note, that the coolant flow exits from tubes 11 as well as openings 12 are located outside of socket 5, so that solder between parts 2 and 7 will not interfere with the coolant as discharged into the cable conductor space. Such low melting solder provides for additional fastening of the conductors to socket 5 inside of sleeve extension 5*b*.

Should solder run out for any reason, clamping straps 14 still hold all of the conductors to tube 7 quite firmly, so that they will not be pulled out. The straps 14 meander to some extent in that they loop around tubes 11 on the radial inside as far as the overall axis of the assembly is concerned, so that clamping and fastening action is not exerted upon the rather thin walled tubes 11; they will not be shut by squeezing.

The cable is assembled in the following manner. The sub-assembly shown in FIG. 3 is provided first, (except for threaded connector 8). Next, the cable conductors are placed on tube 7 and fastened thereto by means of clamp straps 14. The cable conductor ends are firmly positioned in that manner and it can readily be seen that this tube - conductor sub-assembly can be tested as to strength against dislodgement upon pulling on the conductors.

Next, the threaded end of tube 7 (9) is threaded into socket body 5*a* so that the conductor ends will be positioned inside of socket sleeve 5*b*. The space between tube 7 and socket 5 is then filled with soft solder; usually this type of solder has a high tin content. Next, connector 8 with tube 6 soldered (brazed) thereto is threaded to the outer end of tube 7 and hose 1 is finally slipped onto tube 6. Conceivably clamps may be used here also.

The stranded conductors 2 are thereafter stranded as a whole about tube 1, whereupon the second socket is connected to the outer end of the cable. Next, outer tube 3 is provided onto the assembly, including heat protection and wear resistance layers and spacers. That part of the cable assembly is conventional. Finally, the outer tube 3 is secured, actually in water proof fashion, to the outside of socket 5 by means of antimagnetic clamps and/or straps 4.

It should be noted, that the tubes 11 will not only serve for feeding coolant to the cable, but, at the other end and socket, liquid is discharged from the cable in the same fashion. Construction for discharge may not be that critical, but it is clearly economical to use the same kind of socket construction.

The invention is not limited to the embodiments described above but all changes and modifications thereof not constituting departures from the spirit and scope of the invention are intended to be included.

I claim:

1. Liquid cooled, heavy current cable having an inner tube, an outer tube and conductors inbetween the inner and outer tubes, further having a socket for connection to at least one end of each of the conductors, the socket having a sleeve portion for receiving the conductor ends, the socket having a tube disposed inside of said sleeve portion, the socket tube being separated from but separately connected to the said inner tube of said cable; the improvement comprising:

a plurality of individual clamping straps for clamping the conductors to said socket tube, whereby each strap fastens all of the conductors to said socket tube.

2. In a cable as in claim 1, the tube in the socket having outer corrugation.

3. In a cable as in claim 2, the corrugation being only on the outside of the tube.

4. In a cable as in claim 1, the straps being antimagnetic.

5. In a cable as in claim 1 wherein coolant feeder tubes are connected to the socket to feed coolant into space between the conductors, the straps looping underneath said feeder tubes in that each strap engages the feeder tubes with a side of the strap opposite the side that engages the conductors.

6. In a cable as in claim 1, the tube being threadedly received in the socket.

7. In a cable as in claim 1, wherein soft solder is filled into a space as defined between the socket sleeve and the tube therein and not occupied by the conductor ends.

* * * * *